United States Patent
Bales, Sr.

[11] 3,844,476
[45] Oct. 29, 1974

[54] THERMALLY CONTROLLED WATER REGULATOR

[76] Inventor: Russell C. Bales, Sr., 1419 S. 29th Ave., Phoenix, Ariz. 85009

[22] Filed: Oct. 15, 1973

[21] Appl. No.: 406,242

[52] U.S. Cl............. 236/12 R, 137/625.4, 251/333
[51] Int. Cl. .......................................... G05d 23/13
[58] Field of Search.......... 236/12 R, 99; 137/625.4; 251/333

[56] References Cited
UNITED STATES PATENTS

| | | | |
|---|---|---|---|
| 866,906 | 9/1907 | Berry | 251/333 |
| 2,172,489 | 9/1939 | Young | 236/12 |
| 2,209,296 | 7/1940 | Jewell et al. | 137/625.4 X |
| 2,807,421 | 9/1957 | Carlson, Jr. | 236/12 |
| 2,997,239 | 8/1961 | Priesmeyer | 236/12 |
| 3,219,063 | 11/1965 | Schumann et al. | 137/625.33 |

*Primary Examiner*—William E. Wayner
*Attorney, Agent, or Firm*—Cahill, Sutton & Thomas

[57] ABSTRACT

A water regulator for maintaining a constant water temperature output is disclosed. A settable temperature sensitive element drives a valving mechanism to selectively regulate the amount of water flow from a cold water source and a hot water source. The temperature sensitive element is responsive solely to the water temperature within the collection chamber within which both the hot and cold water are mixed and will maintain the temperature of the water therein at a preset value despite temperature variations of the source of hot and cold water.

3 Claims, 2 Drawing Figures

THERMALLY CONTROLLED WATER REGULATOR

The present invention relates to water temperature regulators, and, more particularly, to water regulators providing a settable constant temperature water outflow.

Present water temperature regulators, particularly those used in a home environment, are mechanical regulators limiting the hot and cold water flow in accordance with a preset flow rate. Should the temperature of either the hot or cold water source vary from that extent at the time the regulator is set, the temperature of the water flowing through the regulator will vary accordingly. When such regulators are used for showers or bathtubs, the regulator must be reset during the course of the shower or while filling up the tub as the hot water temperature generally tends to decrease over a period of time. If the hot water heater within the home is of limited capacity, the decrease will be quite rapid if the flow of water in the shower or bathtub is at a high rate.

In order to overcome the decreasing temperature of the hot water supply within the home, various types of water heaters have been constructed which heat the water at a more rapid rate whenever hot water is drawn off. The increased heat generation requires high capacity heating elements and entail additional expense. The increase in capacity of the hot water heaters may be justified in homes where a plurality of consecutive showers are taken or where several bathtubs must be filled consecutively. However, in other homes the excess capacity of the hot water heater is seldom if ever used and thus represents a waste of money.

It is therefore a primary object of the present invention to provide a water temperature regulator for maintaining a constant temperature water outflow.

Another object of the present invention is to provide a mechanical self-adjusting water temperature regulator for maintaining a constant temperature water outflow.

Yet another object of the present invention is to provide a simple low cost mechanical hot water regulator.

Still another object of the present invention is to provide a hot water regulator capable of providing a constant temperature water outflow despite a varying temperature water inflow.

A further object of the present invention is to provide a settable temperature hot water regulator.

A still further object of the present invention is to provide a self-adjusting hot water temperature regulator.

These and other objects of the present invention will become apparent to those skilled in the art as the description thereof proceeds.

The present invention may be described with greater specificity and clarity with reference to the following drawings, in which.

Figure 1:
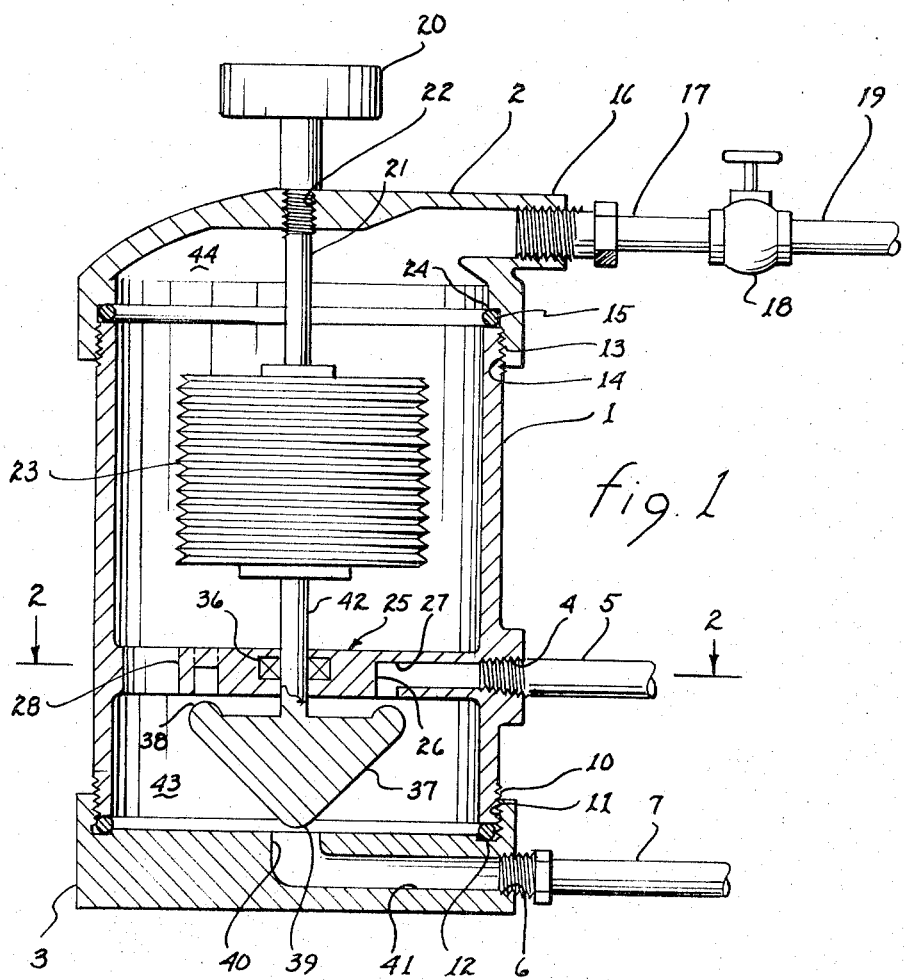
FIG. 1 illustrates a cross-sectional view of the major components of the present invention.
Figure 2:
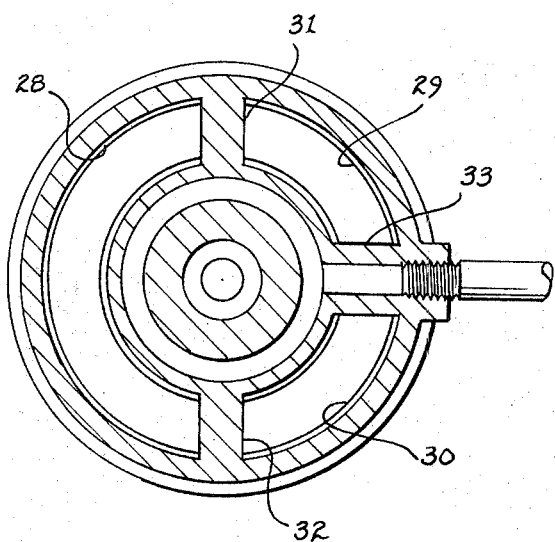
FIG. 2 illustrates a cross-sectional view of the present invention taken along lines 2—2, as shown in FIG. 1.

Referring to FIG. 1, there is shown a cylindrical housing 1 having a cap 2 threadedly secured to the upper end of the housing. External threads 14 may be disposed about the upper end of housing 1 to mate with internal threads 13 disposed about the lower end of cap 13. A seal 15 is disposed intermediate the upper edge of housing 1 and a shoulder 24 within cap 2 to effect a water tight seal therebetween. A discharge outlet 16 extends from cap 2 and threadedly engages an outlet pipe 17. A valve 18 interconnects pipe 17 with a further outlet pipe 19 to regulate the flow of water through discharge outlet 16.

A base 3 is threadedly secured to the lower end of housing 1. Base 3 may include an internally threaded circular ridge 10 for engagement with threads 11 disposed about the periphery of housing 10. A seal 12, such as an O-ring, may be disposed intermediate the edge of housing 1 and base 3 to effect a water tight engagement. A radial cavity 41 is disposed within base 3 and extends from inlet aperture 6 to a centrally located aperture 40. A hot water pipe 7 threadedly engages aperture 6.

A gate member 25 is disposed across housing 1 normal to the longitudinal axis of the generally cylindrical configuration of the housing and divides the housing into a first chamber 43 and a second chamber 44. An inlet aperture 4, connected to a cold water pipe 5, is disposed within the wall of housing 1 in proximity to gate member 25. A cavity 27 extends from inlet aperture 4 through gate 25 to a downwardly opening circular recess 26 to provide a passageway for the cold water from pipe 5 to chamber 43.

Gate member 25 includes a plurality of truncated pie shaped apertures 28, 29 and 30. These apertures provide communication between chamber 43 and 44.

An inverted cone shaped stopper 25, which stopper may be made of resilient material, is mounted upon a shaft 42. Shaft 42 slideably extends through the central part of gate member 25 at the locus of recess 26. A sealing member 36 may be disposed within gate member 25 to provide a water tight seal intermediate the gate member and shaft 42. The apex 39 of stopper 37 is configured to sealably mate with aperture 40 when the stopper is in its lower most position. An annular ridge 38 extends about the base of stopper 37 and cooperates with the circular downwardly oriented recess 26 when the stopper is in its uppermost position. By this arrangement, stopper 37 is capable of sealing or restricting the water outflow from recess 26 or the water outfow through aperture 40.

Shaft 21 threadedly engages the upper surface of cap 2 by means of threads 22. Shaft 21 is rotatable by a knob 20 external to cap 2. By rotating knob 20, shaft 21 will be longitudinally displaced due to the action of threads 22. Intermediate shaft 21 and shaft 42 there is located a temperature responsive bellows 23. Bellows 23 responds to an increase in temperature by expanding. As the longitudinal position of shaft 21 is fixed by knob 20, expansion of the bellows causes a corresponding downward movement of shaft 42. A downward movement of shaft 42 results in stopper 37 being forced toward aperture 40 with apex 39 restricting or inhibiting the flow of water through the aperture. Simultaneously, annular ridge 38 will be displaced from the opening of circular recess 26 to permit an increased water flow therefrom. Should bellows 23 contract in response to a decrease in temperature, apex 39 will be displaced away from aperture 40 and permit a greater rate of water flow through the aperture. Simultaneously, annular ridge 38 will tend to restrict or inhibit the rate of water flow through the opening of recess 26.

As discussed above, cold water is introduced into housing 1 through pipe 5 and hot water is introduced through pipe 7. The water from the two pipes are mixed within chamber 43 and flows therefrom into chamber 44 through apertures 28, 29 and 30. Thus, the temperature of the water within chamber 44 is the ambient temperature resulting from the cold and hot water inputs through pipes 5 and 7.

The ambient temperature within chamber 44 may be increased or decreased by longitudinally repositioning shaft 21 by rotating knob 20 to bias stopper 37 toward the cold water source (circular recess 26) or the hot water source (aperture 40).

Should the temperature of either the cold water or hot water source increase or decrease, the resultant increased or decreased temperature within chamber 40 will be sensed by temperature sensitive bellows 23. If there has been a net decrease in temperature, the bellows will contract and restrict the cold water flow through circular recess 26 until the ambient temperature has been increased due to a larger proportion of hot water flowing out of aperture 40. Conversly, should the ambient temperature within chamber 44 increase, bellows 23 will expand causing stopper 37 to restrict the flow of hot water through aperture 40 and permit an increase of water flow through circular recess 26. Thus, the bellows 23 and stopper 37, in combination, maintain a constant settable ambient water temperature within chamber 44.

In practice, the present invention may be used in the home by directly connecting pipes 5 and 7 to the cold and hot water pipes, respectively. Knob 20 is used to regulate the temperature of the water flowing out of the spigot or shower head, as the case may be. The amount or rate of water flow may be controlled by valve 18. For reasons stated above, the temperature of the outflow of water can be set by knob 20 and will be maintained even though there may be a continuing decrease of the hot water temperature due to the limited capacity of the hot water heater. In this manner, the present invention can be set to provide a constant temperature water flow regardless of temperature variations of the hot and cold water. It is also possible to provide either cold or hot water only through pipe 19 by adjusting stopper 37 to close off one or the other of the water sources.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A water temperature regulator connected to a hot water pipe and a cold water pipe for maintaining a constant temperature water outflow through a discharge outlet, said regulator comprising:

a. a housing including a first and a second chamber, said first chamber being connected to the hot water and cold water pipes for receiving and mixing a flow of hot and cold water, said second chamber being connected to the discharge outlet for discharging the mixed hot and cold water, said housing further including an apertured gate disposed intermediate said first and second housing for providing a passageway from said first chamber to said second chamber;

b. a downwardly opening circular recess disposed within one wall of said first chamber, said circular recess being in communication with the cold water pipe;

c. an upwardly directed aperture in communication with the hot water pipe and disposed within another wall of said first chamber, said aperture being in axial alignment with said circular recess;

d. flow regulating means adapted for reciprocal movement intermediate said circular recess and said aperture for selectively regulating the flow of cold and hot water into said first chamber, said flow regulating means comprising:

1. an inverted cone-shaped valve having an apex and a base;

2. said apex being positionable within said aperture to prevent further water flow therethrough; and 3. an annular ridge extending upwardly from said base for selectively sealingly engaging said recess;

e. a bellows disposed within said second chamber, said bellows being connected to said valve for positioning of said valve intermediate said aperture and said recess in response to the water temperature within said second chamber;

f. adjustment means connected to said bellows for biasing said valve toward said recess or said aperture to restrict the flow of cold and hot water, respectively, into said first chamber; whereby, said adjustment means establishes the initial temperature of the water flowing through said second chamber and said bellows maintains the water temperature constant by operating said valve to regulate the flow of water from the hot water and cold water pipes.

2. The combination as set forth in claim 1 wherein said flow regulating means includes a shaft extending from said bellows through said apertured gate to said valve.

3. The combination as set forth in claim 2 wherein said valve comprises a single cone-shaped element.

* * * * *